US010942260B2

(12) United States Patent
Low

(10) Patent No.: US 10,942,260 B2
(45) Date of Patent: Mar. 9, 2021

(54) MEMS MIRROR WITH EXTENDED FIELD OF VIEW USEFUL FOR VEHICLE LIDAR

(71) Applicant: Aptiv Technologies Limited, St. Michael (BB)

(72) Inventor: Yew Kwang Low, Singapore (SG)

(73) Assignee: Aptiv Technologies Limited, St. Michael (BB)

(*) Notice: Subject to any disclaimer, the term of this patent is extended or adjusted under 35 U.S.C. 154(b) by 212 days.

(21) Appl. No.: 16/184,039

(22) Filed: Nov. 8, 2018

(65) Prior Publication Data

US 2020/0150244 A1    May 14, 2020

(51) Int. Cl.
| | | |
|---|---|---|
| *G01S 7/481* | (2006.01) | |
| *G01S 17/931* | (2020.01) | |
| *G02B 26/08* | (2006.01) | |

(52) U.S. Cl.
CPC .......... *G01S 7/4817* (2013.01); *G01S 17/931* (2020.01); *G02B 26/0833* (2013.01); *B60W 2420/52* (2013.01)

(58) Field of Classification Search
None
See application file for complete search history.

(56) References Cited

U.S. PATENT DOCUMENTS

| | | | | |
|---|---|---|---|---|
| 7,379,191 B2* | 5/2008 | Brooks | .................. | G01B 11/00 356/515 |
| 2007/0181810 A1 | 8/2007 | Tan et al. | | |
| 2018/0039073 A1* | 2/2018 | Low | ...................... | G01S 17/931 |
| 2019/0041524 A1* | 2/2019 | Korsgaard Jensen | ....................... | G02B 26/0833 |
| 2019/0293766 A1* | 9/2019 | Vladutescu | ............. | G01S 7/499 |
| 2020/0096643 A1* | 3/2020 | Low | ...................... | G01S 7/4814 |
| 2020/0158827 A1* | 5/2020 | Hasselbach | .......... | G02B 26/101 |
| 2020/0191962 A1* | 6/2020 | Farris | ...................... | G01S 7/484 |

FOREIGN PATENT DOCUMENTS

| | | |
|---|---|---|
| WO | 2006127199 A1 | 11/2006 |
| WO | 2012061163 A2 | 5/2012 |
| WO | 2012061163 A3 | 5/2012 |

OTHER PUBLICATIONS

European Search Report for Application No. 19203302, European Patent Office, dated Mar. 13, 2020.

* cited by examiner

*Primary Examiner* — Jennifer D. Carruth
(74) *Attorney, Agent, or Firm* — Colby Nipper PLLC

(57) ABSTRACT

An illustrative example detection device includes a source of radiation, at least one mirror that reflects radiation from the source along a field of view having a first width, at least one optic component that is configured to refract radiation reflected from the at least one mirror, and at least one actuator that selectively moves the optic component between a first position and a second position. In the first position the optic component is outside of the field of view and does not refract any of the radiation reflected from the at least one mirror. In the second position the optic component is in the field of view and refracts at least some of the radiation reflected from the at least one mirror. The field of view has a second, larger width when the at least one optic component is in the second position.

20 Claims, 2 Drawing Sheets

MEMS MIRROR WITH EXTENDED FIELD OF VIEW USEFUL FOR VEHICLE LIDAR

BACKGROUND

Advances in electronics and technology have made it possible to incorporate a variety of advanced features on automotive vehicles. Various sensing technologies have been developed for detecting objects in a vicinity or pathway of a vehicle. Such systems are useful for object detection, parking assist and cruise control adjustment features, for example.

More recently, automated vehicle features have become possible to allow for autonomous or semi-autonomous vehicle control. For example, cruise control systems may incorporate LIDAR (light detection and ranging) for detecting an object or another vehicle in the pathway of the vehicle. Depending on the approach speed, the cruise control setting may be automatically adjusted to reduce the speed of the vehicle based on detecting another vehicle in the pathway of the vehicle.

There are different types of LIDAR systems. Flash LIDAR relies upon a single laser source to illuminate an area of interest. Reflected light from an object is detected by an avalanche photodiode array. While such systems provide useful information, the avalanche photodiode array introduces additional cost because it is a relatively expensive component. Additionally, the laser source for such systems has to be relatively high power to achieve sufficiently uniform illumination of the area of interest. Scanning LIDAR systems utilize different components compared to flash LIDAR. One challenge associated with previously proposed scanning LIDAR systems is that the scanning angle is limited. Achieving a wider field of view has required multiple MEMS mirror devices, which increases cost and requires additional packaging space.

SUMMARY

An illustrative example detection device includes a source of radiation, at least one mirror that reflects radiation from the source along a field of view having a first width, at least one optic component that is configured to refract radiation reflected from the at least one mirror, and at least one actuator that selectively moves the optic component between a first position and a second position. In the first position the optic component is outside of the field of view and does not refract any of the radiation reflected from the at least one mirror. In the second position the optic component is in the field of view and refracts at least some of the radiation reflected from the at least one mirror. The field of view has a second, larger width when the at least one optic component is in the second position.

In an example embodiment having one or more features of the detection device of the previous paragraph, the at least one optic component comprises two optic components, a first one of the two optic components is situated on a first side of the field of view, and a second one of the two optic components is situated on a second, opposite side of the field of view.

In an example embodiment having one or more features of the detection device of either of the previous paragraphs, the at least one actuator comprises a first actuator that selectively moves the first of the two optic components and a second actuator that selectively moves the second of the two optic components.

In an example embodiment having one or more features of the detection device of any of the previous paragraphs, the first actuator moves the first one of the two optic components into the second position when the second of the two optic components is in the first position and the second actuator moves the second one of the two optic components into the second position when the first of the two optic components is in the first position.

In an example embodiment having one or more features of the detection device of any of the previous paragraphs, the first and second actuator respectively move the two optic components into respective second positions and the second, larger width of the field of view includes an increase from the first width on each of the first and second sides of the field of view.

In an example embodiment having one or more features of the detection device of any of the previous paragraphs, the at least one mirror comprises a micro-electro-mechanical (MEMs) mirror.

In an example embodiment having one or more features of the detection device of any of the previous paragraphs, the radiation source comprises a laser.

In an example embodiment having one or more features of the detection device of any of the previous paragraphs, the second position is variable within the field of view to achieve a plurality of second widths of the field of view.

In an example embodiment having one or more features of the detection device of any of the previous paragraphs, the first width of the field of view corresponds to a 60 degree field of view and the second width of the field of view corresponds to a 90 degree field of view.

In an example embodiment having one or more features of the detection device of any of the previous paragraphs, the first width of the field of view corresponds to a 60 degree field of view and the second width of the field of view corresponds to a 120 degree field of view.

In an example embodiment having one or more features of the detection device of any of the previous paragraphs, the second width is at least twice as wide as the first width.

In an example embodiment having one or more features of the detection device of any of the previous paragraphs, the optic component comprises a material having a refractive index and an anti-reflection coating having a maximum angle of incidence that establish a difference between the first and second width.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention provide enlarged detector field of view capability at a lower cost while occupying less space compared to other proposed arrangements. Embodiments of this invention are well-suited for automated vehicle LIDAR systems.

Figure 1:
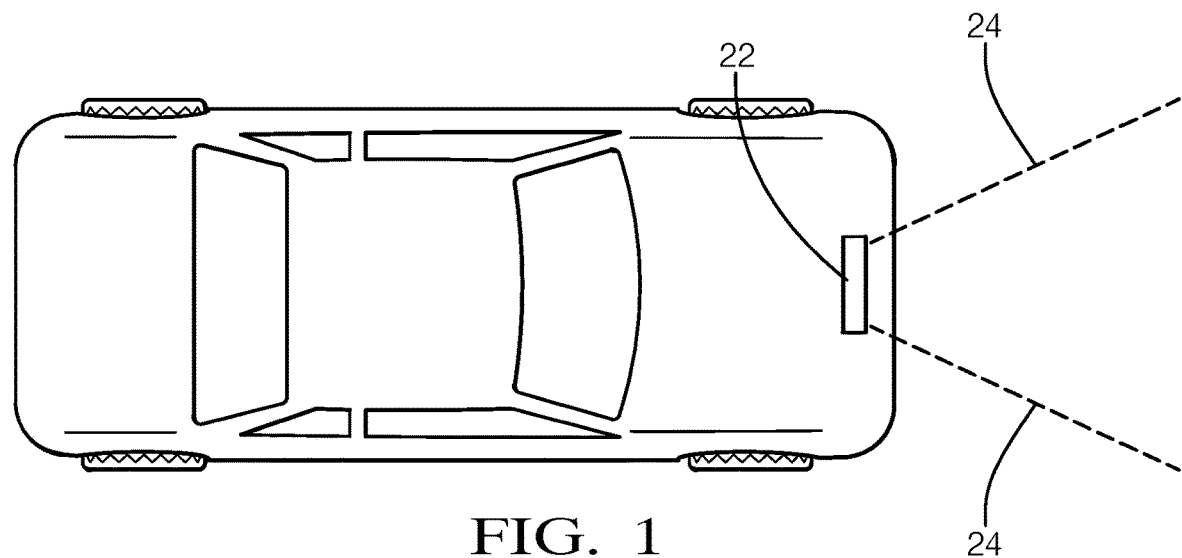
FIG. 1 schematically illustrates a vehicle including a detection device designed according to an embodiment of this invention.

FIG. 1 schematically illustrates a vehicle 20 including a detection device 22. One example use for the detection device 22 is to provide sensing or guidance information for a vehicle, engine or brake controller, such as an automated vehicle controller. For discussion purposes, the detection device 22 is a LIDAR device that emits at least one beam of radiation over a field of view 24 that is useful for detecting objects in a vicinity or pathway of the vehicle 20. In this example, the beam of radiation comprises light that is directed at a selected angle relative to the vehicle 20.

Figure 2:
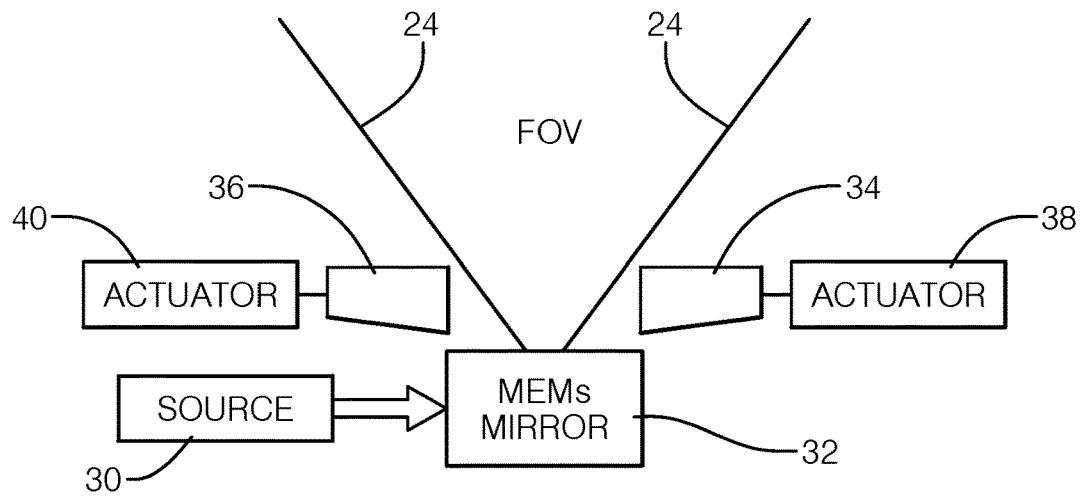
FIG. 2 schematically illustrates selected features of an example detection device designed according to an embodiment of this invention.

FIG. 2 schematically illustrates selected portions of the detection device 22 that provide the radiation along the field of view 24. The detector or receiver components that provide an indication of radiation reflected from an object near the vehicle 20 are not shown but would be included in a manner understood by those skilled in the art. A source 30 of the radiation emits the radiation toward a mirror 32 that reflects the radiation in a desired direction. In this example, the mirror 32 is a micro-electro-mechanical (MEMS) mirror that operates in known manner to establish the field of view 24.

Optic components 34 and 36 and associated actuators 38 and 40, respectively, selectively change the width or scope of the field of view 24 by refracting at least some of the radiation reflected from the mirror 32. The optic components 34 and 36 in this example comprise wedges made of an optical material having a selected index of refraction. The actuators 38 and 40 may comprise, for example, piezoelectric actuators that are capable of moving the associated optic components 34, 36 over a range of motion across 1 mm.

Figure 3:
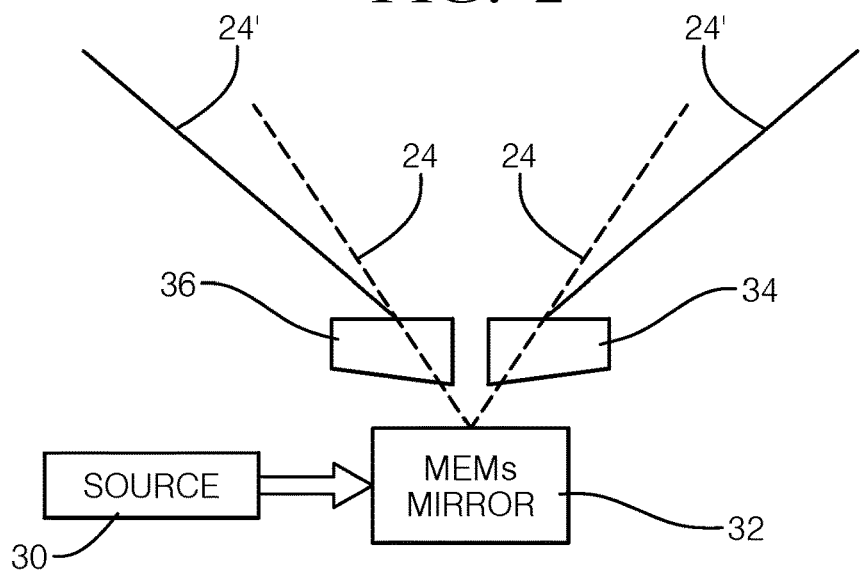
FIG. 3 schematically illustrates an example technique of using the example detection device of FIG. 2 to achieve a wider field of view.

FIG. 3 schematically shows an example technique of using the optic components 34 and 36 to selectively change the width or scope of the field of view 24. In this example, the actuators 38 and 40 selectively move the respective optic components between a first position where the optic component is outside the field of view 24 and a second position where the optic component is at least partially within the field of view 24. When at least one of the optic components 34, 36 is in the field of view 24, it refracts the radiation reflected from the mirror 32 in a manner that widens the field of view 24.

In FIG. 3, a first mode or condition is shown at 40 and can be considered "Mode 1" in which the optic components 34, 36 are in respective first positions and outside the field of view 24. A "Mode 2" is shown at 42 in which the actuator 38 moves the optic component 34 into a second position at least partially within the field of view 24 where the optic component 34 refracts some of the radiation to expand or widen the field of view as shown at 24'. The optic component 36 remains in its first position in Mode 2. In "Mode 3" the actuator 38 returns the optic component 34 to its first position and the actuator 40 moves the optic component 36 at least partially into the field of view 24 to widen it as shown at 24'.

FIG. 3 includes a timing diagram 50 that shows how the optic components 34, 36 can be moved into respective first and second positions over time to achieve a desired width of the field of view 24, 24'. A first plot 54 shows the first position of the optic component 34 in a first position indicated by +1 and the second position indicated by 0. A second plot 56 indicates the first position of the optic component 56 as −1 and the second position as 0. Controlling the actuators 38 and 40 and sequentially moving the optic components 34, 36 as shown in FIG. 3 between Modes 1, 2 and 3, provides a wider field of view 24' for the detection device 22 during a single scanning frame.

The field of view 24 has a first width when both optic components 34, 36 are in the respective first positions and the field of view 24' has a second, larger width when at least one of the optic components 34, 36 is in the respective second position. The difference between the first width and the second width may be selected to meet the needs of a particular detection device 22 or a particular application. For example, changing the configuration or material of the optic components will have an effect on the amount of refraction and the resulting width of the field of view. Also changing the location of the second position can alter the second width. In some embodiments, the optic components 34, 36 are moved into about 8.7 degrees of the field of view while in others the optic components 34, 36 are moved into about 15 degrees of the scanning field. Depending on the configuration of the optic components, such movement may increase the scanning field of view by as much as 30 or 60 degrees, for example.

In some embodiments the field of view 24 has a default range of 60 degrees that corresponds to the optic components 34, 36 being in the respective first positions. When the optic components 34, 36 are in the second position and used to achieve the wider field of view 24' the scanning range or scope of the field of view is 90 degrees in some embodiments and 120 degrees in others. Other ranges are possible in some embodiments depending, for example, on the materials and configurations of the optic components. Selecting the optic component material with an appropriate refractive index and using an anti-reflection coating with a wider angle of incidence requirement makes it possible to achieve even wider ranges with acceptable transmission loss. Those skilled in the art who have the benefit of this description will realize what field of view width will best meet their particular needs and ways to select optic component features to achieve a desired width.

Figure 4:
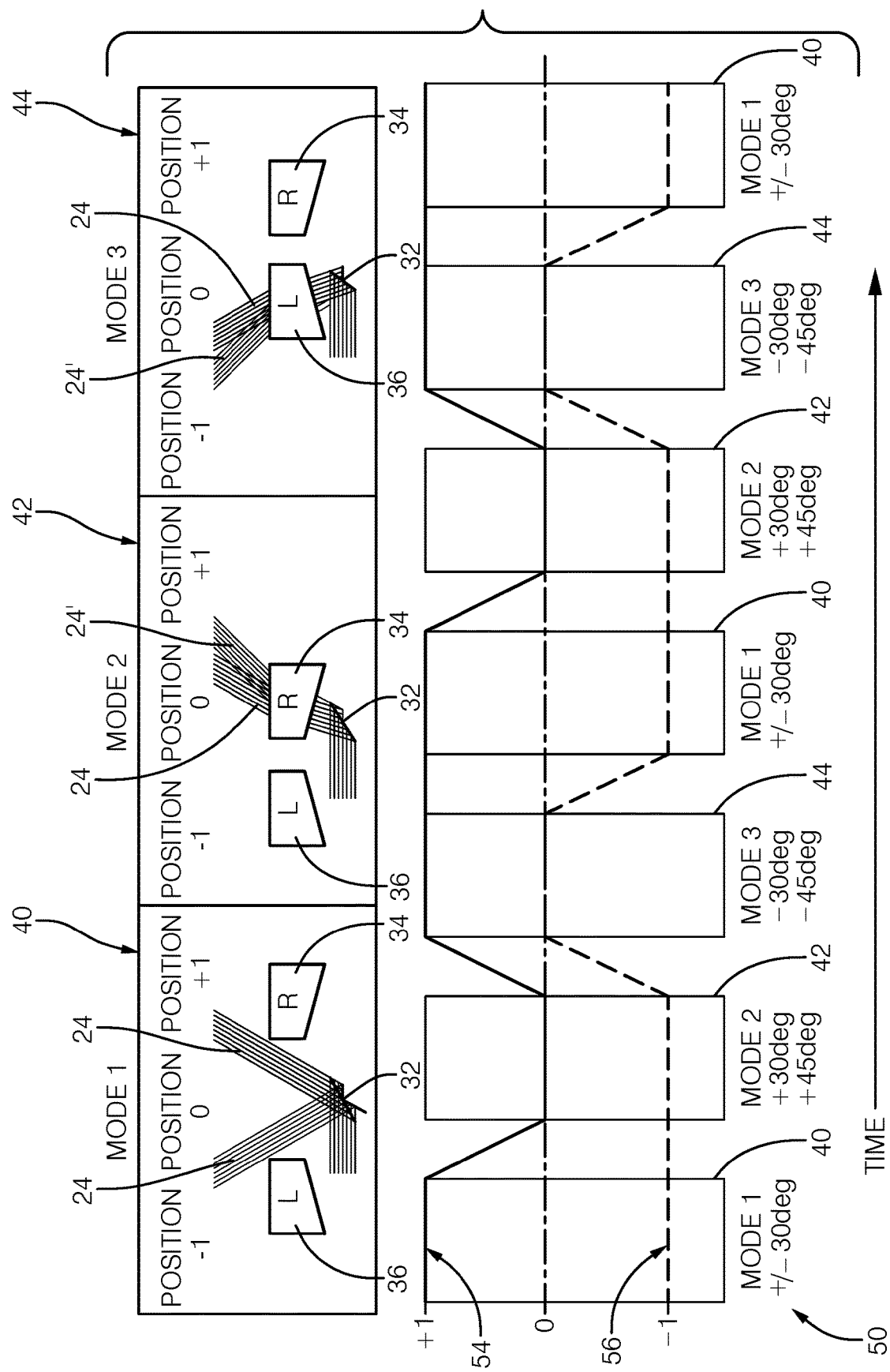
FIG. 4 schematically illustrates another technique of using a device designed according to an embodiment of this invention.

In FIG. 3, only one of the optic components 34, 36 moves into the second position at a particular time. Another embodiment is shown in FIG. 4 in which it is possible to move both optic components into the second position at the same time to achieve the wider field of view 24'. Other embodiments include only one optic component instead of the two shown in the illustrated examples.

Embodiments of this invention provide a wider field of view for a detection device without requiring more than one MEMS mirror. The optic component and actuator make it possible to effectively double the range or width of the field of view at a relatively lower cost compared to increasing the number of detection devices to achieve a cumulatively larger field of view. The increased field of view available from embodiments of this invention comes at a lower cost and fits within a smaller packaging space than was otherwise possible.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:
1. A detection device, comprising:
   a source of radiation;
   at least one mirror that reflects radiation from the source along a field of view having a first width;

at least one optic component that is configured to refract radiation reflected from the at least one mirror; and at least one actuator that selectively moves the optic component between a first position where the optic component is outside of the field of view and does not refract any of the radiation reflected from the at least one mirror and a second position where the optic component is in the field of view and refracts at least some of the radiation reflected from the at least one mirror, wherein the field of view has a second, larger width when the at least one optic component is in the second position.

2. The device of claim 1, wherein
the at least one optic component comprises two optic components;
a first one of the two optic components is situated on a first side of the field of view; and
a second one of the two optic components is situated on a second, opposite side of the field of view.

3. The device of claim 2, wherein the at least one actuator comprises a first actuator that selectively moves the first of the two optic components and a second actuator that selectively moves the second of the two optic components.

4. The device of claim 3, wherein
the first actuator moves the first one of the two optic components into the second position when the second of the two optic components is in the first position; and
the second actuator moves the second one of the two optic components into the second position when the first of the two optic components is in the first position.

5. The device of claim 3, wherein
the first and second actuator respectively move the two optic components into respective second positions; and
the second, larger width of the field of view includes an increase from the first width on each of the first and second sides of the field of view.

6. The device of claim 1, wherein the at least one mirror comprises a micro-electro-mechanical (MEMs) mirror.

7. The device of claim 1, wherein the radiation source comprises a laser.

8. The device of claim 1, wherein the second position is variable within the field of view to achieve a plurality of second widths of the field of view.

9. The device of claim 1, wherein
the first width of the field of view corresponds to a 60 degree field of view; and
the second width of the field of view corresponds to a 90 degree field of view.

10. The device of claim 1, wherein
the first width of the field of view corresponds to a 60 degree field of view; and
the second width of the field of view corresponds to a 120 degree field of view.

11. The device of claim 1, wherein the second width is at least twice as wide as the first width.

12. The device of claim 1, wherein the optic component comprises a material having a refractive index and an anti-reflection coating having a maximum angle of incidence that establish a difference between the first and second width.

13. A method of operating a detection device, comprising:
reflecting, with at least one mirror of the detection device, radiation from a radiation source along a field of view having a first width;
refracting, with at least one optic component of the detection device, radiation reflected from the at least one mirror; and
moving, with at least one actuator of the detection device, the at least one optic component between a first position where the optic component is outside of the field of view and does not refract any of the radiation reflected from the at least one mirror and a second position where the optic component is in the field of view and refracts at least some of the radiation reflected from the at least one mirror, wherein the field of view has a second, larger width when the at least one optic component is in the second position.

14. The method of claim 13, wherein
the at least one optic component comprises two optic components;
a first one of the two optic components is situated on a first side of the field of view; and
a second one of the two optic components is situated on a second, opposite side of the field of view.

15. The method of claim 14, including moving the at least one optic component by selectively moving the first of the two optic components with a first actuator, and selectively moving the second of the two optic components with a second actuator.

16. The method of claim 15, including moving, with the first actuator, the first one of the two optic components into the second position when the second of the two optic components is in the first position; and
moving, with the second actuator, the second one of the two optic components into the second position when the first of the two optic components is in the first position.

17. The method of claim 15, including moving, with the first and second actuator respectively, the two optic components into respective second positions and increasing a first width of the field of view to a second width of the field of view by increasing from the first width on each of the first and second sides of the field of view.

18. The method of claim 13, wherein the at least one mirror comprises a micro-electro-mechanical (MEMs) mirror of the detection device.

19. The method of claim 13, wherein the radiation source comprises a laser of the detection device.

20. The method of claim 13, wherein the second position is variable within the field of view to achieve a plurality of second widths of the field of view.

\* \* \* \* \*